United States Patent [19]

Shiozaki et al.

[11] Patent Number: 4,860,033

[45] Date of Patent: Aug. 22, 1989

[54] BASE PLATE HAVING AN OXIDATION FILM AND AN INSULATING FILM FOR INK JET RECORDING HEAD AND INK JET RECORDING HEAD USING SAID BASE PLATE

[75] Inventors: Atsushi Shiozaki, Isehara; Hirokazu Komuro; Koichi Sato, both of Hiratsuka; Kazuaki Masuda, Sagamihara, all of Japan

[73] Assignee: Canon Kabushiki Kaisha, Tokyo, Japan

[21] Appl. No.: 151,299

[22] Filed: Feb. 1, 1988

[30] Foreign Application Priority Data

| | | | |
|---|---|---|---|
| Feb. 4, 1987 | [JP] | Japan | 62-23995 |
| Feb. 4, 1987 | [JP] | Japan | 62-23996 |
| Feb. 4, 1987 | [JP] | Japan | 62-23997 |

[51] Int. Cl.[4] .......... G01D 15/16

[52] U.S. Cl. .......... 346/140 R

[58] Field of Search .......... 346/140

[56] References Cited

U.S. PATENT DOCUMENTS

| | | | |
|---|---|---|---|
| 4,410,899 | 10/1983 | Haruta et al. | 346/140 R |
| 4,535,343 | 8/1985 | Wright | 346/140 |
| 4,567,493 | 1/1986 | Ikeda et al. | 346/140 R |
| 4,596,994 | 6/1986 | Matsuda et al. | 346/140 R |
| 4,638,337 | 1/1987 | Torpey | 346/140 |
| 4,694,306 | 9/1987 | Ikeda | 346/140 |
| 4,777,494 | 10/1988 | Shibata et al. . | |
| 4,783,369 | 11/1988 | Sugata et al. . | |

FOREIGN PATENT DOCUMENTS

| | | |
|---|---|---|
| 3443564 | 6/1985 | Fed. Rep. of Germany . |
| 2151555 | 7/1985 | United Kingdom . |

*Primary Examiner*—Joseph W. Hartary
*Attorney, Agent, or Firm*—Fitzpatrick, Cella, Harper & Scinto

[57] ABSTRACT

A base plate for ink jet recording head provided with an electricity-heat convertor and an ink jet recording head using the same are provided. The electricity-heat convertor comprises a substrate, a pair of electrodes electrically connected to said heat-generating resistor, an oxidized film provided by local anodic oxidation of the surface of said heat-generating resistor between said electrodes, and an organic insulating film provided on said electrodes and on at least a part of said heat-generating resistor between said electrodes.

39 Claims, 9 Drawing Sheets

BASE PLATE HAVING AN OXIDATION FILM AND AN INSULATING FILM FOR INK JET RECORDING HEAD AND INK JET RECORDING HEAD USING SAID BASE PLATE

BACKGROUND OF THE INVENTION

1. Field of the Invention

This invention relates to a base plate for an ink jet recording head used for an ink jet recording apparatus which performs recording by forming droplets of ink by discharging ink and attaching the droplets onto a recording medium such as paper, etc. and to an ink jet recording head by use of said base plate.

2. Related Background Art

The ink jet recording method is a method in which recording is performed by discharging ink (liquid for recording) through an orifice (ink discharge port) provided in a recording head and attaching the ink onto a recording medium such as paper. This method has a number of advantages such that generation of noise is extremely small, and also high speed recording is possible, and yet the use of plain paper is possible, i.e., paper for recording having special constitution is not required, and therefore recording heads of various types of this kind have been developed.

Among them, recording heads of the type which permit ink to be discharged through an orifice by applying heat energy to ink have advantages such as good repsonse to recording signals, easy formation of high density multi-orifice, etc.

A typical constitution of such recording heads of the type utilizing heat energy as an ink discharging energy is shown in FIGS. 1A and 1B. FIG. 1A is a sectional view in the flow passage direction of the recording head, and FIG. 1B is a partial exploded view showing the positional relationship of bonding between the base plate and the ceiling plate.

The recording head of FIGS. 1A and 1B shown as an example has a constitution comprising electricity-heat converters arranged on a base plate 1, and further a protective layer provided on the heat-generating resistors 9 and the electrodes 3 of the electricity-heat convertors to be positioned finally under the flow passages 6 and the liquid chamber 11, and a ceiling plate bonded thereto having flow passages 6 and a liquid chamber 11 formed thereon.

The ink discharging energy in this recording head is imparted by the electricity-heat cnoverters 8 each having a pair of electrodes 3 and a heat-generating resistor 9 positioned between the electrodes. More specifically, when heat is generated from the heat-generating resistor 9 by causing a current between the electrodes 3, the ink in the flow passage 6 in the vicinity of the heat-generating resistor 9 is instantaneously heated to generate bubbles there, and droplets of ink are discharged from the orifice through volume change by instantaneous volume expansion and shrinkage by generation of the bubbles.

The protective layer provided on at least the electricity-heat converters in the recording head with the constitution as described above is provided for the purpose of protecting the electrodes and the heat-generating resistors against the ink in the recording head and preventing current leak between a pair of electrodes. Also, particularly for the purpose of protecting the electricity-heat converters from the shock during generation of the discharging energy, a so called cavitation resistance layer may be further provided in some cases.

As a material constituting such a protective layer, inorganic materials having insulating properties such as metal oxides, etc. and organic materials such as resins, etc. have been used in the prior art, and among them, anodically oxidized coatings obtained by anodic oxidation of metal materials have good insulating properties, and also the equipment necessary for preparation thereof is not so large as compared with the vacuum vapor deposition method, thus having the advantage of high productivity, and therefore they are attracting attention as a material capable of constituting the protective layer for electricity-heat converter.

However, in the recording head of the prior art using the anodically oxidized coating as the protective layer or a part thereof, various problems remain yet for utilizing effectively the anodically oxidized film as the protective layer.

For example, in the recording head described in German Offenlegungsshchrift 3403643, a protective layer of high reliability is obtained by anodic oxidation of the electrode surface, and it is described that an anodically oxidized coating may be also formed on the surface of the heat-generating resistor at the same time. Whereas, when protective layers comprising anodically oxidized coating are formed on both of the electrode surface and the heat-generating resistor surface, if the materials of the electrode and the heat-generating resistor are different, the anodically oxidized coatings formed on these surfaces will be different in the characteristics such as composition and volume expansion, and therefore sometimes the protective performance was not sufficient or defects such as cracks are liable to be formed at the boundary portion of the anodically oxidized coating between the electrodes and the heat-generating resistor. Moreover, selection of the conditions and the materials for obtaining good protective performances of anodically oxidized coatings for both the electrode surfaces and the heat-generating resistor surface are greatly limited as compared with the case of forming a single anodically oxidized coating, whereby there is also involved the difficulty that the constituent materials of the recording head such as electrodes, heat-generating resistor, etc. and the conditions of the anodic oxidation cannot be freely selected.

On the other hand, German Offenlegungsschrift 3502900 discloses an ink jet recording head having an inorganic insulating film as the protective layer formed according to the thin film forming technique such as the CVD method, and its defective portions subjected to the anodic oxidation treatment to have anodically oxidized coatings on the electrodes and the heat-generating resistor surfaces existing in the defective portions. Whereas, even if the protective performances of the inorganic insulating film and the anodically oxidized film additionally provided may be good, the protective performance at the boundary therebetween may not be sometimes necessarily sufficient, thus posing a problem to be improved. Also, in this recording head, an inorganic insulating film is formed according to the thin film forming technique, but the thin film forming technique requires a large scale apparatus and also its operations are complicated to involve the problem that productivity and workability are inferior as compared with the anodic oxidation steps or photolithographic steps utilizing a photosensitive resion.

Further, in the bubble type ink jet printing device described in U.S. Pat. No. 4,532,530, a protective layer of an oxidized coating obtained by thermal oxidation of the heat-generating resistor surface at a high temperature of 1000° C. is formed on the heat-generating resistor surface, and also an anodically oxidized coating is formed on the electrodes. While this printing device has the advantage of being capable of production by utilizing the IC production technique or its device as such, the device becomes a large scale and also its operations are complicated. Moreover, it is not suited for producing an ink jet recording head of the so called full multitype with a large area by a simple device and with good workability.

On the other hand, U.S. Pat. No. 4,535,343 also discloses a thermal ink jet printing head having anodically oxidized coatings provided on the heat-generating resistor surface and the electrode surface. However, this head also had the same problems as in the above German Offenlegungsschrift 3502900.

SUMMARY OF THE INVENTION

The present invention has been accomplished in view of the problems as mentioned above, and its object is to provide a base plate for ink jet recording head of high performance and reliability utilizing effectively the characteristics of anodically oxidized film for the protective layer of an electricity-heat convertor and an ink jet recording head by use of said base plate.

Another object of the present invention is to provide a base plate for ink jet recording head having a protective layer which can be produced by simpler working steps without use of a large scale apparatus and an ink jet recording head by use of said base plate.

The present invention is intended to provide a base plate for ink jet recording head provided with an electricity-heat convertor comprising a substrate, a heat-generating resistor provided on said substrate, a pair of electrodes electrically connected to said heat-generating resistor, an oxidized film provided by local anodic oxidation of the surface of said heat-generating resistor between said electrodes, and an organic insulating film provided on said electrodes and on at least a part of said heat-generating resistor between said electrodes, and an ink jet recording head having said base plate for ink jet recording head and an orifice for discharging ink provided correspondingly to said electricity-heat convertor.

Also, the present invention is intended to provide a base plate for an ink jet recording head provided with an electricity-heat convertor comprising a substrate, a heat-generating resistor provided on said substrate, a pair of electrodes electrically connected to said heat-generating resistor at a predetermined interval therebetween, an oxidized film provided by anodic oxidation of the surface of said heat-generating resistor within the predetermined interval, and an organic insulating film provided on said electrodes under the state with at least a part of the surface of said oxidized film being exposed, and an ink jet recording head provided with an orifice for discharging ink and an electricity-heat convertor for generation of heat energy to be utilized for discharging said ink. The electricity-heat convertor comprises a substrate, a heat-generating resistor provided on said substrate, a pair of electrodes electrically connected to said heat-generating resistor at a predetermined interval therebetween, an oxidized film provided by anodic oxidation of the surface of said heat-generating resistor within the predetermined interval, and an organic insulating film provided on said electrodes under the state with at least a part of the surface of said oxidized film being exposed.

Further, the present invention is intended to provide a base plate for an ink jet recording head provided with an electricity-heat convertor comprising a substrate, a heat-generating resistor provided on said substrate, a pair of electrodes electrically connected to said heat-generating resistor at a predetermined interval therebetween, an oxidized film provided by anodic oxidation of the surfaces of said electrodes and the surface of said heat-generating resistor within the predetermined interval, and an organic insulating film provided on said electrodes under the state with at least a part of the surface of said oxidized film at the portion of said heat-generating film at the portion of said heat-generating resistor being exposed, and an ink jet recording head provided with an orifice for discharging ink and an electricity-heat convertor for generation of heat energy to be utilized for discharging said ink. The electricity-heat convertor comprises a substrate, a heat-generating resistor provided on said substrate, a pair of electrodes electrically connected to said heat-generating resistor at a predetermined interval therebetween, an oxidized film provided by anodic oxidation of the surfaces of said electrodes and the surface of said heat-generating resistor within the predetermined interval, and an organic insulating film provided on said electrodes under the state with at least a part of the surface of said oxidized film at the portion of said heat-generating resistor being exposed.

DETAILED DESCRIPTION OF THE PREFERRED EMBODIMENTS

Referring now to its production steps by use of the drawings, the constitutions of the base plate for ink jet recording head and the recording head by use thereof are to be described in detail.

[Type A]

Figure 2:
FIGS. 2(*a*)–2(*h*), FIGS. 3(*a*)–3(*j*) and FIGS. 4(*a*)–4(*h*) each illustrate schematically the main steps of an example of the method for forming the base plate for ink jet recording head of the present invention.
Figure 2:
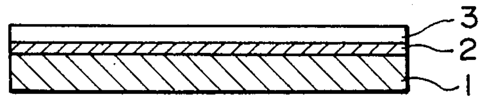
Figure 2:
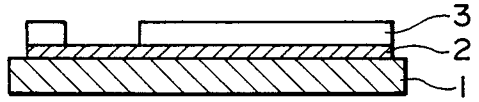
Figure 2:
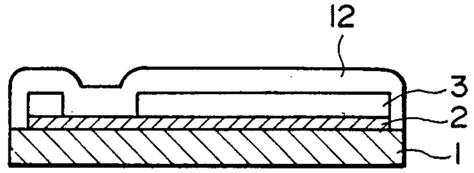
Figure 2:
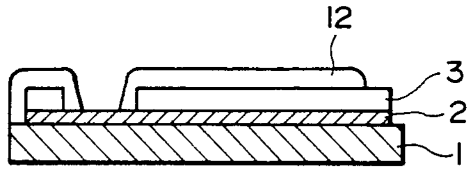
Figure 2:
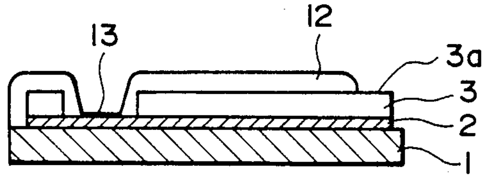
Figure 2:
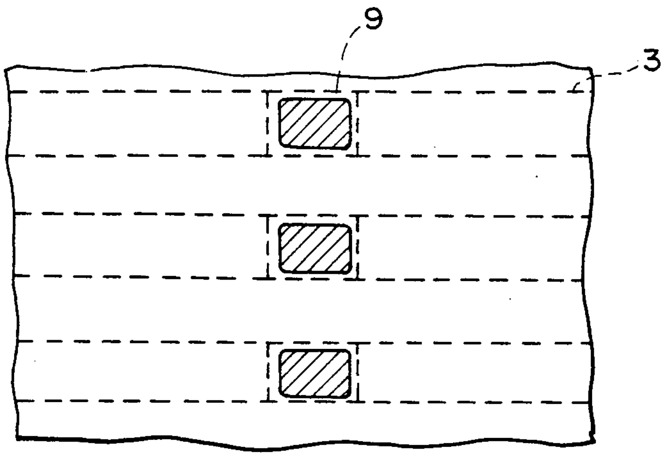
Figure 2:
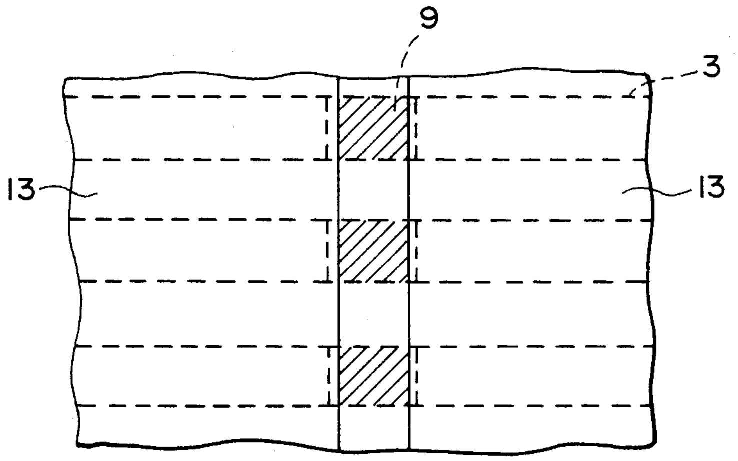

FIGS. 2(*a*)–2(*f*) illustrate diagramatically as a section of substrate an example of the steps for preparation of an embodiment of the base plate for an ink jet recording head of the present invention which provides an electricity-heat convertor.

Figure 1A:
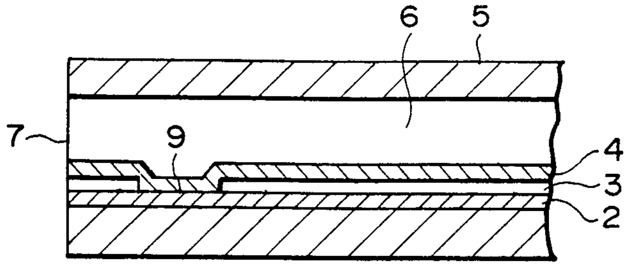
FIG. 1A PRIOR ART
FIGS. 1A and 1B are illustrations showing a typical constitution of the ink jet recording head, FIG. 1A being the sectional portion along the flow passage, and FIG. 1B being a partially exploded view showing the positional relationship between the ceiling plate and the substrate.
Figure 1B:
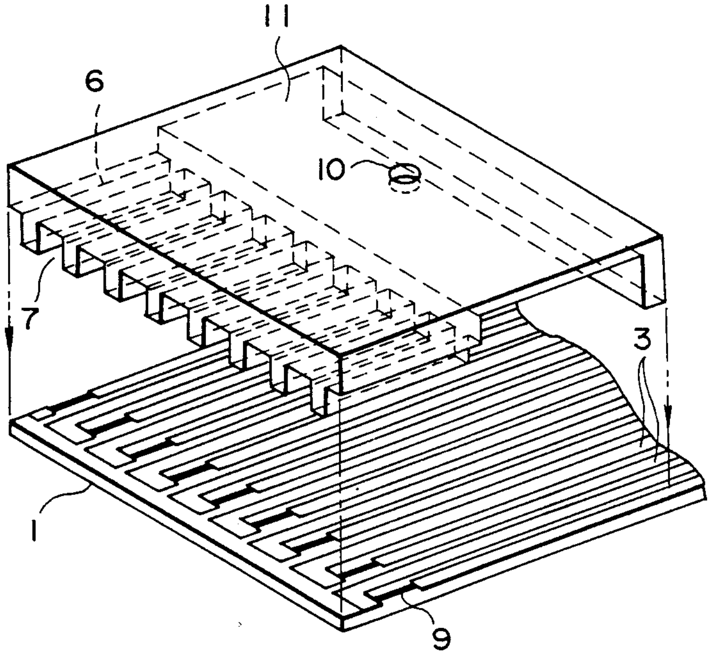
FIG. 1B PRIOR ART

For preparation of the base plate for an ink jet recording head of the present invention, first, a heat-generating resistor layer 2 and an electrode layer 3 are laminated in this order on a substrate 1 as shown in FIG. 2(*b*) by such method as sputtering, etc., and these are subjected to patterning to a predetermined shape by utilizing the photolithographic steps as shown in FIG. 2(*c*) to provide a heat-generating resistor 9 between a pair of electrodes 3 constituted of the return structure as shown in FIG. 1B.

As the material to be used for the substrate 1, the heat-generating resistor layer 2 and the electrode layer 3, any materials which can be used for these portions of the ink jet recording head can be utilized without limitation. Further, a heat accumulating layer may be provided on the substrate surface.

Also, in the operations up to this stage, not only the method by combination of lamination and patterning as described above, but also various methods can be used by suitable selection.

Next, on the substrate is laminated as shown in FIG. 2(*d*) an organic insulating film 12 comprising a resin capable of easy patterning and forming a coating excellent in performance as a protective film to be provided on the electrodes 3 and the heat-generating resistor 9 such as a photosensitive polyimide resin, specifically polyimidoisoindoloquinazolinedione (trade name: PIQ, produced by Hitachi Kasei), a polyimide resin (trade name: PYRALIN, produced by Du Pont), a cyclized butadiene (trade name: JSR-CBR, CBR-M901, produced by Japan Synthetic Rubber Co.), Photoneece (trade name, produced by Toray), etc.

Further, the organic insulating film 12 is subjected to patterning as shown in FIG. 2(*e*), so that the surface of the heat-generating resistor 9 at which the anodically oxidized coating is to be provided may be exposed.

Here, under the state with the exposed heat-generating resistor surface being contacted with a solution for the anodic oxidation treatment, the electrode end portion exposed at the electrode take-out portion is connected to the anode of power source, and the reaction is carried out for a predetermined time to have the anodically oxidized coating 13 formed at the exposed portion of the heat-generating resistor 9 as shown in FIG. 2(*f*).

The method to be used for the anodic oxidation treatment is not particularly limited, provided that it is a method capable of forming an anodically oxidized coating excellent in the characteristics as protective film as described above by anodic oxidation of the material constituting the heat-generating resistor 9. For example, it may be possible to utilize the method generally used or known as the method for oxidation treatment of a metal material such as Al, Mg, Ti, Ta, etc.

Thus, the base plate for ink jet recording head of the present invention comprising the substrate 1 formed as an electricity-heat convertor having the protective layers 12, 13 can be prepared. FIG. 2(*g*) shows a plan view of the base plate prepared showing as shadowed portion of the anodically oxidized coating.

Further, on the base plate is bonded a ceiling plate having a flow passage and a liquid chamber as shown in FIG. 1B while effecting registration so that the heat-generating resistor may be arranged at the predetermined position within the flow passage, and then the bonded product is cut at the predetermined position on the downstream side of the heat-generating resistor, if necessary, to form an orifice, thus completing the ink jet recording head of the present invention.

As shown in FIG. 2(*h*), the organic insulating film 13 may be provided with a band-shaped interval therebetween, as a matter of course.

[Type B]

Figure 3:
Figure 3:
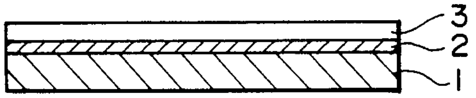
Figure 3:
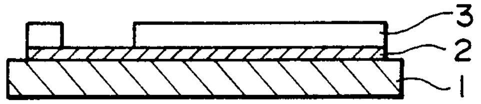
Figure 3:
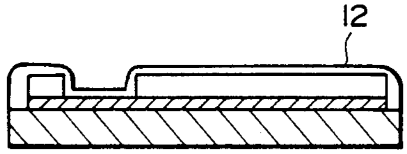
Figure 3:
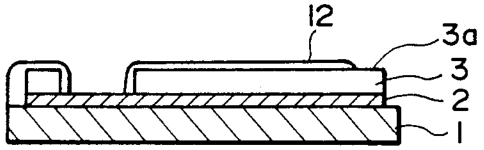
Figure 3:
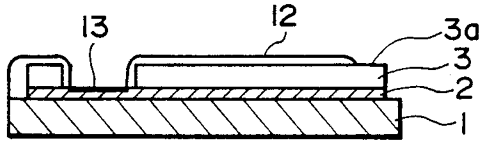
Figure 3:
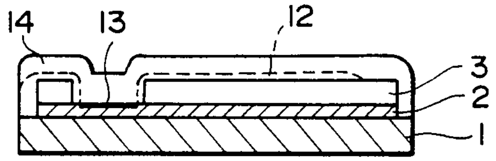
Figure 3:
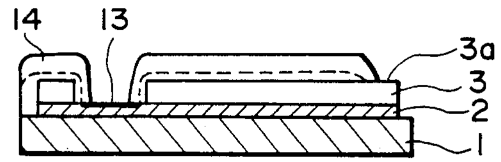
Figure 3I:
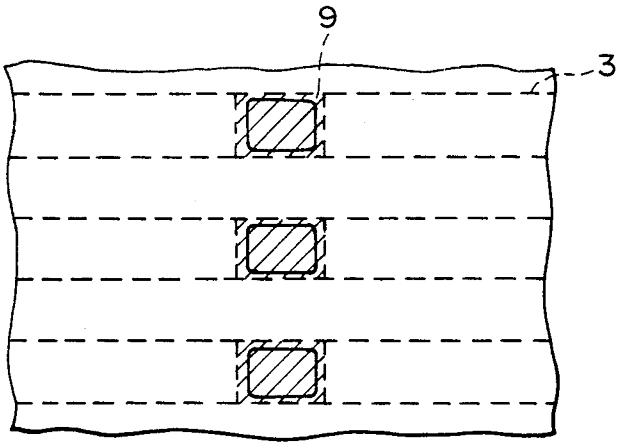
Figure 3J:
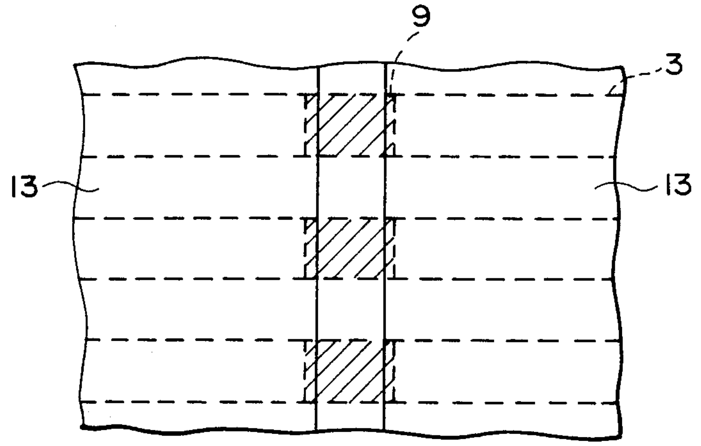

FIGS. 3(*a*)–3(*h*) illustrate as a section of substrate an example of the steps for providing an electricity-heat convertor during preparation of another embodiment of the base plate for an ink jet recording head of the present invention.

For preparation of the base plate for ink jet recording head of the present invention, first, a heat-generating resistor layer 2 and an electrode layer 3 are laminated in this order on a substrate 1 as shown in FIG. 3(*b*) by such method as sputtering, etc., and these are subjected to patterning to a predetermined shape by utilizing the photolithographic steps as shown in FIG. 3(*c*) to provide a heat-generating resistor 9 between a pair of electrodes 3 constituted of the return structure as shown in FIG. 1B.

As the material to be used for the substrate 1, the heat-generating resistor layer 2 and the electrode layer 3, any materials which can be used for these portions of the ink jet recording head can be utilized without limitation. Further, a heat accumulating layer may be provided on the substrate surface.

Also, in the operations up to this stage, not only the method by combination of lamination and patterning as described above, but also various methods can be used by suitable selection.

Next, on the substrate is laminated as shown in FIG. 3(*d*) a resist film 12 comprising a photosensitive resin, etc. capable of easy patterning and functioning as the mask in the anodic oxidation treatment performed later such as a photosensitive polyimide resin.

As the resist film used here, there may be also used those photosensitive polyimide films capable of forming a coating excellent in performances as a protective film to be provided on the electrodes 3 and the heat-generating resistor 9, in addition to the above characteristics, including specifically polyimidoisoindoloquinazolinedione (trade name: PIQ, produced by Hitachi Kasei), a polyimide resin (trade name: PYRALIN, produced by Du Pont), a cyclized butadiene (trade name: JSR-CBR, CBR-M901, produced by Japan Synthetic Rubber Co.), Photoneece (trade name, produced by Toray), etc.

Next, the resist film 12 is subjected to patterning as shown in FIG. 3(*e*) by the photolithographic steps, etc. so that a part of the electrode 3 (electrode take-out portion 3*a*), and the surface of the heat-generating resistor 9 at which the anodically oxidized coating is to be provided may be exposed.

Here, under the state with the exposed heat-generating resistor surface being contacted with a solution for the anodic oxidation treatment, the electrode end portion exposed at the electrode take-out portion is connected to the anode of power source, and the reaction is carried out for a predetermined time to have the anodically oxidized coating 13 formed at the exposed portion of the heat-generating resistor 9 as shown in FIG. 3(*f*).

The method to be used for the anodic oxidation treatment is not particularly limited, provided that it is a method capable of forming an anodically oxidized coating excellent in the characteristics as a protective film as described above by anodic oxidation of the material constituting the heat-generating resistor 9. For example, it may be possible to utilize the method generally used or known as the method for oxidation treatment of a metal material such as Al, Mg, Ti, Ta, etc.

Further, when the anodically oxidized film 13 is formed, if the resist film 12 cannot be utilized as such as a protective film, it is removed from the substrate 1. If it can be utilized as a protective film such as a photosensitive polyimide resin, it may be left to remain as such as shown by the dotted line.

Next, as shown in FIG. 3(*g*), on the substrate 1 is further laminated an organic insulating film 14 comprising a resin utilizable as a protective layer such as a photosensitive polyimide resin previously mentioned, and the film is again subjected to patterning as shown in FIG. 3(*h*) by the photolithographic steps so that the principal portion of the anodically oxidized coating already formed and the electrode take-out portion 3*a* may be formed, to give the base plate for ink jet recording of the present invention. FIG. 3(*i*) shows a plan view of the base plate in which the anodically oxidized portion is shown as a shadowed portion.

Finally, on the base plate having the electricity-heat convertor having protective layers 13, 14 formed thereon is bonded a ceiling plate having a flow passage and a liquid chamber as shown in FIG. 1B while effecting registration so that the heat-generating resistor may be arranged at the predetermined position within the flow passage, and then the bonded product is cut at the predetermined position on the downstream side of the heat-generating resistor, if necessary, to form an orifice, thus completing the ink jet recording head of the present invention.

As shown in FIG. 3(*j*), the organic insulating film 13 may be provided with a band-shaped interval therebetween, as a matter of course.

[Type C]

Figure 4:
Figure 4:
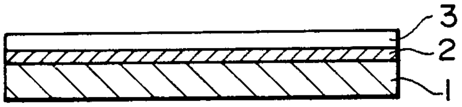
Figure 4:
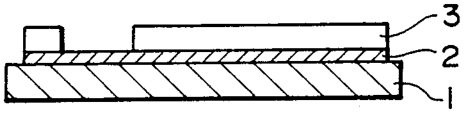
Figure 4:
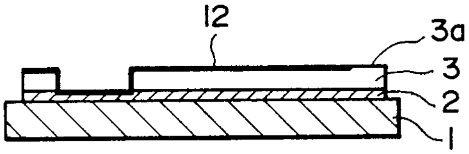
Figure 4:
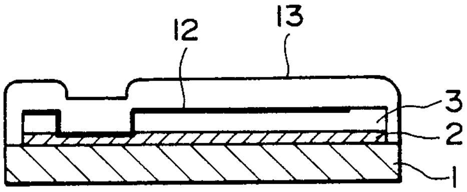
Figure 4:
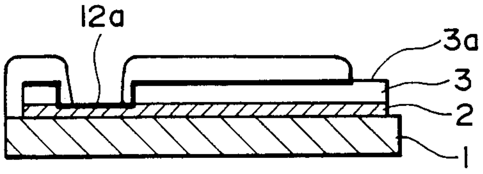
Figure 4G:
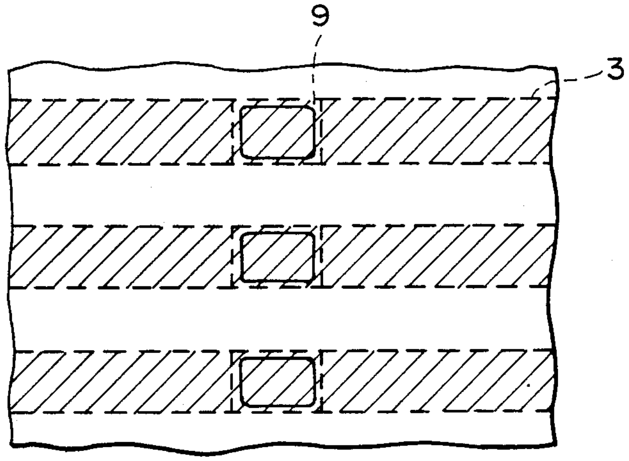
Figure 4H:
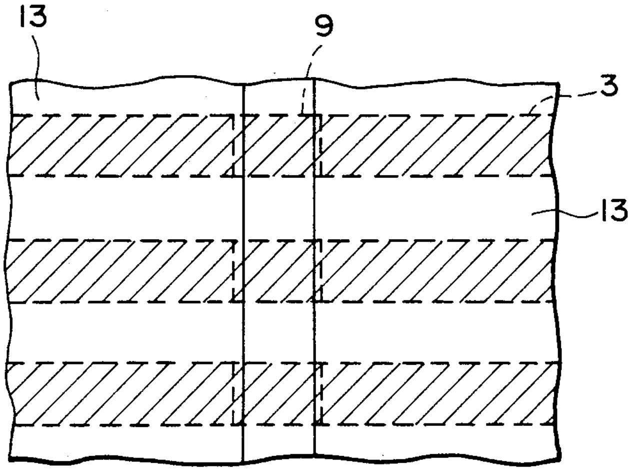

FIGS. 4(*a*)–4(*h*) illustrate as a section of substrate an example of the preparation steps of still another embodiment of the base plate for ink jet recording head of the present invention.

For preparation of the base plate for an ink jet recording head of the present invention, first, a heat-generating resistor layer 2 and an electrode layer 3 are laminated in this order on a substrate 1 as shown in FIG. 4(*b*) by such method as sputtering, etc., and these are subjected to patterning to a predetermined shape by utilizing the photolithographic steps as shown in FIG. 4(*c*) to provide a heat-generating resistor 9 between a pair of electrodes 3 constituted of the return structure as shown in FIG. 1B.

As the material to be used for the substrate 1, the heat-generating resistor layer 2 and the electrode layer 3, any materials which can be used for these portions of the ink jet recording head can be utilized without limitation. Further, a heat accumulating layer may be provided on the substrate surface.

Also, in the operations up to this stage, not only the method by combination of lamination and patterning as described above, but also various methods can be used by suitable selection.

Here, under the state with the exposed heat-generating resistor surface being contacted with a solution for the anodic oxidation treatment, the electrode end portion exposed at the electrode take-out portion 3*a* is connected to the anode of power source, and the reaction is carried out for a predetermined time to have the anodically oxidized coating 12 formed at the exposed portion of the heat-generating resistor 9 as shown in FIG. 4(*d*).

The method to be used for the anodic oxidation treatment is not particularly limited, provided that it is a method capable of forming an anodically oxodized coating excellent in the characteristics as a protective film as described above by anodic oxidation of the material constituting the heat-generating resistor 9. For example, it may be possible to utilize the method generally used or known as the method for oxidation treatment of a metal material such as Al, Mg, Ti, Ta, etc.

Also, the portion of the electrodes 3 to be applied with the anodic oxidation treatment may be other than the terminal portion for connecting electrically with the external portion, and about half on the heat-generating resistor side of the substrate may be anodically oxidized for dipping into the oxidation treatment solution.

Next, on the substrate 1 is laminated as shown in FIG. 4(*e*) an organic insulating film 13 comprising a photosensitive resin, etc. resin capable of easy patterning and having excellent performance as a protective film to be provided on the electrodes 3 and the heat-generating resistor 9, including specifically polyimidoisoindoloquinazolinedione (trade name: PIQ, produced by Hitachi Kasei), a polyimide resin (trade name: PYRALIN, produced by Du Pont), a cyclized butadiene (trade name: JSR-CBR, CBR-M901, produced by Japan Synthetic Rubber Co.), Photoneece (trade name, produced by Toray), etc.

Subsequently, as shown in FIG. 4(*f*), the organic insulating film is removed by photolithographic steps, etc. from the principal part 12*a* of the anodic oxidation coating 13 and the electrode take-out portion 3*a* on the substrate 1, whereby the base plate for ink jet recording head of the present invention can be obtained. FIG. 4(*g*) shows a plan view of the base plate in which the anodically oxidized portion is shown as a shadowed portion.

Finally, on the base plate having the electricity-heat convertor having protective layers 13, 14 formed thereon is bonded a ceiling plate having a flow passage and a liquid chamber as shown in FIG. 1B while effecting registration so that the heat-generating resistor may be arranged at the predetermined position within the flow passage, and then the bonded product is cut at the predetermined position on the downstream side of the heat-generating resistor, if necessary, to form an orifice, thus completing the ink jet recording head of the present invention.

As shown in FIG. 4(*h*), the organic insulating film 13 may be provided with a band-shaped interval therebetween, as a matter of course.

The present invention is described below in more detail by referring to Examples.

EXAMPLE 1

(TYPE A)

Preparation of an ink jet recording head of the present invention (Type A) was practiced in the following manner by performing formation of an electricity-heat convertor according to the steps shown in FIG. 2.

First, the surface of Si wafer was thermally oxidized to form an $SiO_2$ coating with a thickness of 3 μm, thereby obtaining a substrate. Next, on the surface of the substrate where the $SiO_2$ coating was formed, a Ta layer with a thickness of 3000 Å as the heat-generating resistor layer and an Al layer with a thickness of 5000 Å as the electrode layer were laminated by sputtering in this order.

Next, the Ta layer and the Al layer were subjected successively to patterning by the photolithographic steps to form return electrodes and heat-generating resistors (50 μm×150 μm) with Ta layers exposed between a pair of electrodes at an arrangement density of 8 dots/mm as shown in FIG. 1B.

Next, a photosensitive polyimide resin [Photoneece (produced by Toray)] was spin coated to a thickness of about 2 μm, and further the resin was removed from on the principal part of the heat-generating resistor except for the vicinity of the boundary with the electrodes and from on the portion which becomes the electrode take-out portion.

Here, under the state with the surface-exposed portion of the heat-generating resistor previously formed being dipped in an aqueous solution containing boric acid at 0.5 mol/liter and sodium tetraborate at 0.05 mol/liter, the electrode end portion exposed at the electrode take-out portion was connected to the anode of a power source of 200 V to effect the anodic oxidation treatment for 20 seconds.

After completion of the anodic oxidation, the head was taken out from the reaction liquid, thoroughly washed and dried, following by bonding of a ceiling plate comprising a glass having a flow passage and a liquid chamber as shown in FIG. 1(B) with an epoxy adhesive while effecting registration so that the heat-generating resistor may be arranged at the predetermined position within the flow passage, and then the heat-generating resistor of the bonded product was cut at the downstream side with a dicing saw to form an orifice, thus completing an ink jet recording head of the present invention.

Further, by repeating the above procedure, a large number of ink jet recording heads of the present invention were prepared and a durability test was conducted under the recording conditions shown below for evaluation thereof, and the results of a Weibull plot are shown by (1) in FIG. 5.

Figure 5:
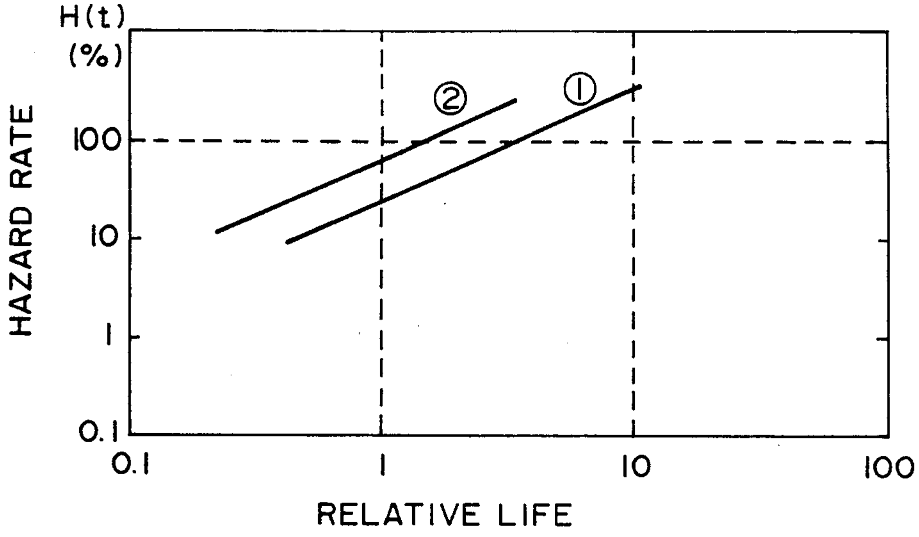
FIG. 5 to FIG. 7 are graphs showing the evaluation results of the recording heads obtained in Examples 1–3.

Driving voltage = 1.2 × foaming voltage
Driving frequency: 3 KHz
Pulse width: 2 $\mu$sec The results shown by (2) in FIG. 5 are those of the same evaluation conducted for comparative purpose with the use of recording head of the prior art having the same constitution as the recording head obtained in the above Example except for providing no organic resin protective layer, namely with the protective layer consisting only of electrodes and an anodically oxidized coating formed by anodic oxidation of the surface of the heat-generating resistor.

In the recording head by use of the base plate for ink jet recording of this Example, a protective layer comprising an anodically oxidized coating was provided at the principal portion of the surface of the heat-generating resistor constituting the electricity-heat converter, whereby oxidation of the heat-generating resistor with heat, or the reaction of the heat-generating resistor with ink by leak current could be effectively prevented.

Further, a homogeneous organic insulating film was provided on the electricity-heat convertor extending from the portion other than the anodically oxidized coating over the electrodes, whereby the boundary portion between the heat-generating resistor and the electrodes at which no protective layer having good protective performance has been deemed to be formed with difficulty was covered with this organic insulating film to be effectively protected, and its reliability could be improved to great extent.

EXAMPLE 2

(TYPE B)

Preparations of a base plate for an ink jet recording head and an ink jet recording head of the present invention by use of said base plate were practiced in the following manner by performing formation of an electricity-heat convertor according to the steps shown in FIG. 3.

First, the surface of Si wafer was thermally oxidized to form an $SiO_2$ coating with a thickness of 3 $\mu$m, thereby obtaining a substrate. Next, on the surface of the substrate where the $SiO_2$ coating was formed, a Ta layer with a thickness of 3000 Å as the heat-generating resistor layer and an Al layer with a thickness of 5000 Å as the electrode layer were laminated by sputtering in this order.

Next, the Ta layer and the Al layer were subjected successively to patterning by the photolithographic steps to form return electrodes and heat-generating resistors (50 $\mu$m × 150 $\mu$m) with Ta layers exposed between a pair of electrodes at an arrangement density of 8 dots/mm as shown in FIG. 1B.

Next, a photosensitive polyimide resin [Photoneece (produced by Toray)]was spin coated to a thickness of about 2 $\mu$m, and further the resin was removed from on the principal part of the heat-generating resistor except for the vicinity of the boundary with the electrodes and from on the portion which becomes the electrode take-out portion.

Here, under the state with the surface-exposed portion of the heat-generating resistor previously formed being dipped in an aqueous solution containing boric acid at 0.5 mol/liter and sodium tetraborate at 0.05 mol/liter, the electrode end portion exposed at the electrode take-out portion was connected to the anode of a power source of 200 V to effect the anodic oxidation treatment for 20 seconds.

After completion of the anodic oxidation, the head was taken out from the reaction liquid, thoroughly washed and dried, followed by spin coating of the same photosensitive polyimide resin as described above on the entire surface of the substrate where the heat-generating resistor and the electrodes were provided, and subsequently according to the photolithographic steps, the organic insulating film was patterned so that the principal portion of the anodically oxidized coating provided on the heat-generating resistor surface and the portion which became the electrode take-out portion were exposed to have a double layer structure of the anodically oxidized coating and the organic insulating film formed on at least the brim portion on the electrode sides of the anodically oxidized coating, and also said organic insulating film may extend from the brim portion of the anodically oxidized coating via the boundary portion between the electrodes and the heat-generating resistor over the electrodes.

Finally, a ceiling plate comprising a glass having a flow passage and a liquid chamber as shown in FIG. 1B was bonded with an epoxy adhesive while effecting registration so that the heat-generating resistor may be arranged at the predetermined position within the flow passage, and further the heat-generating resistor of the bonded product was cut at the downstream side with a dicing saw to form an orifice, thus completing an ink jet recording head of the present invention.

Further, by repeating the above procedure, a large number of ink jet recording heads of the present invention were prepared and durability test was conducted under the recording conditions shown below for evaluation thereof, and the results of the Weibull plot are shown by (1) in FIG. 6.

Figure 6:
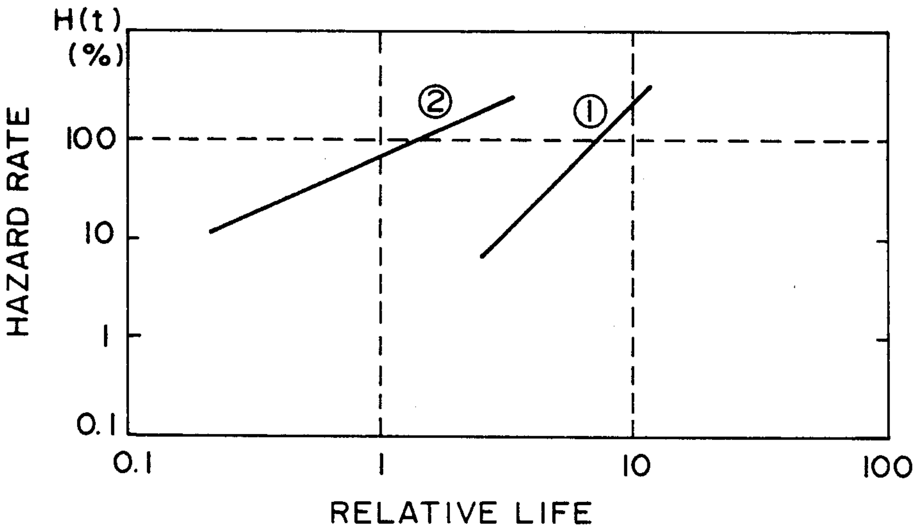

Driving voltage = 1.2 × foaming voltage
Driving frequency: 3 KHz
Pulse width: 2 $\mu$sec The results shown by (2) in FIG. 6 are those of the same evaluation conducted for comparative purpose with the use of a recording head of the prior art having the same constitution as the recording head obtained in the above Example except for providing no organic resin protective layer, namely with the protective layer consisting only of electrodes and an anodically oxidized coating formed by anodic oxidation of the surface of the heat-generating resistor.

In the recording head by use of the base plate for ink jet recording of this Example, a protective layer comprising an anodically oxidized coating was provided at the principal portion of the surface of the heat-generating resistor constituting the electricity-heat convertor, whereby oxidation of the heat-generating resistor with heat, or the reaction of the heat-generating resistor with ink by leak current could be effectively prevented.

Further, an organic insulating film extending from the brim portion on the electrode side of the anodically oxidized coating on the heat-generating resistor surface of the electricity-heat convertor to over the electrodes was further provided, whereby the boundary portion between the heat-generating resistor and the electrodes at which no protective layer having good protective performance has been deemed to be formed with difficulty was covered with this organic insulating film to be effectively protected, and moreover at the boundary portion between the anodically oxidized coating and the organic insulating film, these were provided overlappingly to exclude sufficiently the danger of lowering in protective performance at the boundary between the protective layers of different kinds, and its reliability could be improved to a great extent.

EXAMPLE 3

(TYPE C)

Preparation of an ink jet recording head of the present invention was practiced in the following manner by performing formation of an electricity-heat convertor according to the steps shown in FIG. 4.

First, the surface of Si wafer was thermally oxidized to form an $SiO_2$ coating with a thickness of 3 μm, thereby obtaining a substrate. Next, on the surface of the substrate where the $SiO_2$ coating was formed, a Ta layer with a thickness of 3000 Å as the heat-generating resistor layer and an Al layer with a thickness of 5000 Å as the electrode layer were laminated by sputtering in this order.

Next, the Ta layer and the Al layer were subjected successively to patterning by the photolithographic steps to form return electrodes and heat-generating resistors (50 μm×150 μm) with Ta layers exposed between a pair of electrodes at an arrangement density of 8 dots/mm as shown in FIG. 1B.

Here, under the state with the surface-exposed portion of the heat-generating resistor previously formed being dipped in an aqueous solution containing boric acid at 0.5 mol/liter and sodium tetraborate at 0.05 mol/liter, the electrode end portion exposed at the electrode take-out portion was connected to the anode of a power source of 200 V to effect the anodic oxidation treatment for 20 seconds.

After completion of the anodic oxidation, the head was taken out from the reaction liquid, thoroughly washed and dried, followed by spin coating of a photosensitive polyimide resin Photoneece [(produced by Toray)] to a thickness of about 2 μm, which was further subjected to patterning according to the photolithographic steps, so that the principal portion of the anodically oxidized coating provided on the heat-generating resistor surface and the portion which became the electrode take-out portion were exposed, and also the organic insulating layer covering from the brim portion on the electrode side of the anodically oxidized coating formed on the heat-generating resistor surface via the boundary portion between electrodes and the heat-generating resistor to over a part of the electrodes could be formed.

Finally, a ceiling plate comprising a glass having a flow passage and a liquid chamber as shown in FIG. 1B was bonded with an epoxy adhesive while effecting registration so that the heat-generating resistor may be arranged at the predetermined position within the flow passage, and further the heat-generating resistor of the bonded product was cut at the downstream side with a dicing saw to form an orifice, thus completing an ink jet recording head of the present invention.

Further, by repeating the above procedure, a large number of ink jet recording heads of the present invention were prepared and a durability test was conducted under the recording conditions shown below for evaluation thereof, and the results of Weibull plot are shown by (1) in FIG. 7.

Figure 7:
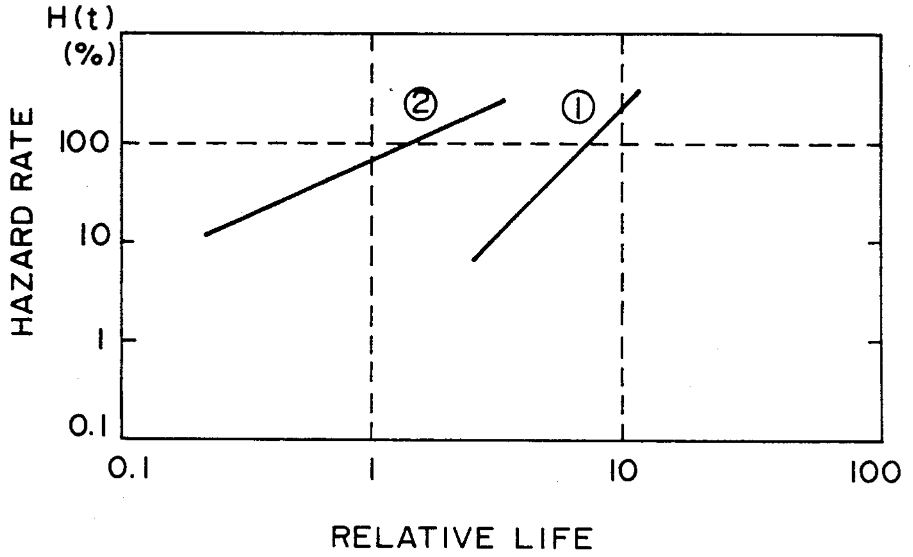

Driving voltage = 1.2×foaming voltage
Driving frequency: 3 KHz
Pulse width: 2 μsec The results shown by (2) in FIG. 7 are those of the same evaluation conducted for comparative purpose with the use of a recording head of the prior art having the same constitution as the recording head obtained in the above Example except for providing no organic resin protective layer, namely with the protective layer consisting only of electrodes and an anodically oxidized coating formed by anodic oxidation of the surface of the heat-generating resistor.

In the recording head by use of the base plate for ink jet recording of this Example, a protective layer comprising an anodically oxidized coating was provided at the principal portion of the surface of the heat-generating resistor constituting the electricity-heat convertor, whereby oxidation of the heat-generating resistor with heat, or the reaction of the heat-generating resistor with ink by leak current could be effectively prevented.

Besides, an organic insulating film extending from the brim portion on the electrode side of the anodically oxidized coating on the heat-generating resistor surface of the electricity-heat convertor to over the electrodes was further provided, whereby the boundary portion between the heat-generating resistor and the electrodes at which no protective layer having good protective performance has been deemed to be formed with difficulty was covered with this organic insulating film to be effectively protected, and moreover these protective performances were exhibited to give better protective function at the brim portion on the electrode side of the anodically oxidized coating on the heat-generating resistor surface covered with the protective layer comprising a double layer structure of the anodically oxidized coating and the organic insulating film and on the electrode surfaces, and its reliability could be improved to great extent.

In the present invention, since a protective layer comprising an anodically oxidized coating at the principal portion on the heat-generating resistor surface constituting the electricity-heat converter, the reaction of the heat-generating resistor and ink by leak current can be prevented.

Further, since a homogeneous organic insulating film extending from the portion other than the anodically oxidized coating on the heat-generating resistor surface of the electricity-heat converter to over the electrodes is provided to protect effectively the boundary between the heat-generating resistor and the electrodes, at which a protective layer has been deemed to be formed with difficulty, by coverage with the organic insulating layer, whereby its reliability could be improved to great extent.

Further, in the anodic oxidation treatment in Examples of Type A and Type B in the present invention, the conditions which can well afford oxidation of only one kind of heat-generating resistor is to be set, whereby its control can be easily done.

Further, in Type B and Type C, an organic insulating film extending from the brim portion on the electrode side of the anodically oxidized coating on the heat-generating resistor surface of the electricity-heat convertor to over the electrodes is provided, whereby the boundary portion between the heat-generating resistor and the electrodes at which no protective layer having good protective performance has been deemed to be formed with difficulty is covered with this organic insulating film to be effectively protected, and moreover at the boundary portion between the anodically oxidized coating and the organic insulating film, these are provided overlapping to exclude sufficiently the danger of lowering in protective performance at the boundary between the protective layers of different kinds, and its reliability could be improved to great extent.

Besides, in Type C, an organic insulating film extending from the brim portion on the electrode side of the anodically oxidized coating on the heat-generating resistor surface of the electricity-heat convertor to over electrodes is further provided, whereby the boundary portion between the heat-generating resistor and the electrodes at which no protective layer having good protective performance has been deemed to be formed with difficulty is covered with this organic insulating film to be effectively protected, and moreover these protective performances are exhibited to give better protective function at the brim portion on the electrode side of the anodically oxidized coating on the heat-generating resistor surface and on the electrode surfaces, covered with the protective layer comprising a double layer structure of the anodically oxidized coating and the organic insulating film, and its reliability could be improved to great extent.

Further, in the anodic oxidation treatment in the present invention, by calling attention on the heat-generating resistor material, for example, even the conditions not sufficient for coatability of the anodically oxidized film in view of the electrode material can be also used, whereby its control can be easily done and freedom in selection of materials is also great.

In the present invention, an organic insulating film was provided even onto a part of the heat-generating resistor between electrodes, but since no extreme elevation of temperature occurs by thermal conductivity of electrodes in the vicinity of electrodes, no inconvenience is caused in durability, except for an organic insulating film which is particularly weakly resistant to heat.

What is claimed is:

1. A base plate for an ink jet recording head provided with an electricity-heat convertor comprising:
- a substrate;
- a heat-generating resistor provided on said substrate;
- a pair of electrodes electrically connected to said heat-generating resistor;
- an oxidized film provided by local anodic oxidation of a surface of said heat-generating resistor between said electrodes; and
- an organic insulating film provided on a region including at least a part of each of said electrodes, said insulating film being in the vicinity of said oxidized film and forming an exposed region of said oxidized film and a bonding region bonding to said oxidized film.

2. A base plate for an ink jet recording head according to claim 1, wherein a heat accumulating layer is further provided between said substrate and said heat generating resistor.

3. A base plate for an ink jet recording head according to claim 1, wherein said organic insulating film is formed by use of a photosensitive polyimide resin.

4. A base plate for an ink jet recording head according to claim 1, wherein said electrodes are selected from Al, Mg, Ti and Ta.

5. An ink jet recording head provided with an orifice for discharging ink and an electricity-heat convertor for generating heat energy to be utilized for discharging the ink, said electricity-heat convertor comprising:
- a substrate;
- a heat-generating resistor provided on said substrate;
- a pair of electrodes electrically connected to said heat-generating resistor at a predetermined interval therebetween;
- an oxidized film provided by local anodic oxidation of a surface of said heat-generating resistor within the predetermined interval; and
- an organic insulating film provided on a region including at least a part of each of said electrodes, said insulating film being in the vicinity of said oxidized film and forming an exposed region of said oxidized film and a bonding region bonding to said oxidized film.

6. An ink jet recording head according to claim 5, wherein a heat accumulating layer is further provided between said substrate and said heat generating resistor.

7. An ink jet recording head according to claim 5, wherein said organic insulating film is formed by use of a photosensitive polyimide resin.

8. An ink jet recording head according to claim 5, wherein said electrodes are selected from Al, Mg, Ti and Ta.

9. A base plate for an ink jet recording head provided with an electricity-heat convertor comprising:
- a substrate;
- a heat-generating resistor provided on said substrate;
- a pair of electrodes electrically connected to said heat-generating resistor at a predetermined interval therebetween;
- an oxidized film provided by anodic oxidation of a surface of said heat-generating resistor within the predetermined interval; and
- an organic insulating film provided on a region including at least a part of each of said electrodes, said insulating film being in the vicinity of said oxidized film and forming an exposed region of said oxidized film.

10. A base plate for an ink jet recording head according to claim 9, wherein a heat accumulating layer is further provided between said substrate and said heat generating resistor.

11. A base plate for an ink jet recording head according to claim 9, wherein said organic insulating film is formed by use of a photosensitive polyimide resin.

12. A base plate for an ink jet recording head according to claim 9, wherein said electrodes are selected from Al, Mg, Ti and Ta.

13. An ink jet recording head provided with an orifice for discharging ink and an electricity-heat convertor for generating heat energy to be utilized for discharging said ink, said electricity-heat convertor comprising:

a substrate;

a heat-generating resistor provided on said substrate;

a pair of electrodes electrically connected to said heat-generating resistor at a predetermined interval therebetween;

an oxidized film provided by anodic oxidation of a surface of said heat-generating resistor within the predetermined interval; and an organic insulating film provided on a region including at least a part of each of said electrodes, said insulating film being in the vicinity of said oxidized film and forming an exposed region of said oxidized film.

14. An ink jet recording head according to claim 13, wherein a heat accumulating layer is further provided between said substrate and said heat generating resistor.

15. An ink jet recording head according to claim 13, wherein said organic insulating film is formed by use of a photosensitive polyimide resin.

16. An ink jet recording head according to claim 13, wherein said electrodes are selected from Al, Mg, Ti and Ta.

17. A base plate for an ink jet recording head provided with an electricity-heat convertor comprising:

a substrate;

a heat-generating resistor provided on said substrate;

a pair of electrodes electrically connected to said heat-generating resistor at a predetermined interval therebetween;

an oxidized film provided by anodic oxidation of the surfaces of said electrodes and a surface of said heat-generating resistor within the predetermined interval; and an organic insulating film provided on a region including at least a part of each of said electrodes, said insulating film being in the vicinity of said oxidized film and forming an exposed region of said oxidized film.

18. A base plate for an ink jet recording head according to claim 17, wherein a heat accumulating layer is further provided between said substrate and said heat generating resistor.

19. A base plate for an ink jet recording head according to claim 17, wherein said organic insulating film is formed by use of a photosensitive polyimide resin.

20. A base plate for an ink jet recording head according to claim 17, wherein said electrodes are selected from Al, Mg, Ti and Ta.

21. An ink jet recording head provided with an orifice for discharging ink and an electricity-heat convertor for generating heat energy to be utilized for discharging said ink, said electricity-heat convertor comprising:

a substrate;

a heat-generating resistor provided on said substrate;

a pair of electrodes electrically connected to said heat-generating resistor at a predetermined interval therebetween;

an oxidized film provided by anodic oxidation of surfaces of said electrodes and a surface of said heat-generating resistor within the predetermined interval; and an organic insulating film provided on a region including at least a part of each of said electrodes, said insulating film being in the vicinity of said oxidized film and forming an exposed region of said oxidized film.

22. An ink jet recording head according to claim 21, wherein a heat accumulating layer is further provided between said substrate and said heat generating resistor.

23. An ink jet recording head according to claim 21, wherein said organic insulating film is formed by use of a photosensitive polyimide resin.

24. An ink jet recording head according to claim 21, wherein said electrodes are selected from Al, Mg, Ti and Ta.

25. A base plate for an ink jet recording head according to claim 1, wherein said heat-generating resistor is formed of a material selected from Al, Mg, Ti and Ta.

26. An ink jet recording heat according to claim 5, wherein said heat-generating resistor is formed of a material selected for Al, Mg, Ti and Ta.

27. A base plate for an ink jet recording head according to claim 9, wherein said heat-generating resistor is formed of a material selected from Al, Mg, Ti and Ta.

28. An ink jet recording head according to claim 13, wherein said heat-generating resistor is formed of a material selected from Al, Mg, Ti and Ta.

29. A base plate for an ink jet recording head according to claim 17, wherein said heat-generating resistor is formed of a material selected from Al, Mg, Ti and Ta.

30. An ink jet recording head according to claim 21, wherein said heat-generating resistor is formed of a material selected from Al, Mg, Ti and Ta.

31. A base plate for an ink jet recording head having an electrothermal transducer comprising:

a first surface region formed of an oxidized film by anodic oxidation at a position corresponding to a heat-generating region of said electrothermal transducer; and a second surface region formed of an organic insulating film, said second surface region being continuous with said first surface region through an integral connection with said oxidized film.

32. A base plate according to claim 31, wherein said organic insulating film is provided to cover an area ranging from a peripheral portion on said anodic oxidated film to said electrode along a boundary portion between said electrode and said heat-generating resistor.

33. A base plate according to claim 31, wherein said organic insulating film is provided to cover an area ranging from a peripheral portion on a side of said electrode of said anodic oxidated film to at least a part of each of said electrodes along a boundary portion between said electrode and said heat-generating resistor.

34. An ink jet recording head having a space for housing ink and a base plate for an ink jet recording head having an electrothermal transducer comprising:

a first surface region formed of an oxidized film by anodic oxidation at a position corresponding to the heat generating region of said electrothermal transducer; and a second surface region formed of an organic insulating film, said second surface region being continuous with said first surface region through an integral connection with said oxidized film, said first surface region and said second surface region forming an inside wall surface of said space for housing ink.

35. An ink jet recording apparatus having an ink jet recording head for effecting recording by driving an electrothermal transducer in response to a recording signal to cause thermal energy to discharge ink from an orifice, thereby emitting ink onto a recording medium, said ink jet recording head comprising:

a liquid chamber;

a liquid path communicating with said liquid chamber;

a base plate for said ink jet recording head including said electrothermal transducer, a pair of electrodes receiving a recording signal and a heat-generating resistor defined by said pair of electrodes, said base plate further comprising a first surface region formed of an oxidized film by anodic oxidation at a position corresponding to a heat-generating region of said electrothermal transducer, and a second surface region formed of an organic insulating film, said second surface region being continuous with said first surface region through an integral connection with said oxidized film, and said first surface region and second surface region forming part of an inner wall of said liquid path.

36. An ink jet recording apparatus according to claim 35, wherein said organic insulating film is provided to cover an area ranging from a peripheral portion on said anodic oxidated film to said electrode along a boundary portion between said electrode and said heat-generating resistor.

37. An ink jet recording apparatus according to claim 35, wherein said organic insulating film is provided to cover an area ranging from a peripheral portion on a side of said electrode of said anodic oxidated film to at least a part of each of said electrodes along a boundary portion between said electrode and said heat-generating resistor.

38. An ink jet recording apparatus according to claim 35, wherein said ink jet recording head has a driving voltage 1.2 times a foaming voltage and with a pulse width of 2 μsec.

39. An ink jet recording apparatus according to claim 35, wherein said heat-generating resistor is formed of a material selected from Al, Mg, Ti and Ta.

* * * * *

UNITED STATES PATENT AND TRADEMARK OFFICE
CERTIFICATE OF CORRECTION

PATENT NO. : 4,860,033

DATED : August 22, 1989

INVENTOR(S) : ATSUSHI SHIOZAKI, ET AL. Page 1 of 2

It is certified that error appears in the above-identified patent and that said Letters Patent is hereby corrected as shown below:

COLUMN 1

Line 50, "cnoverters 8" should read --converters 8--.

COLUMN 2

Line 68, "photosensitive resion." should read --photosensitive resin.--.

COLUMN 9

Line 15, "following" should read --followed--.
Line 36, "recording head" should read --a recording head--.

COLUMN 10

Line 64, "the Weibull plot" should read --a Weibull plot--.

COLUMN 13

Line 30, "overlapping" should read --overlappingly--.
Line 39, "electrodes" should read --the electrodes--.
Line 54, "attention on" should read --attention to--.

UNITED STATES PATENT AND TRADEMARK OFFICE
CERTIFICATE OF CORRECTION

PATENT NO. : 4,860,033

DATED : August 22, 1989

INVENTOR(S) : ATSUSHI SHIOZAKI, ET AL.

It is certified that error appears in the above-identified patent and that said Letters Patent is hereby corrected as shown below:

COLUMN 16

Line 27, "ink jet recording heat" should read --ink jet recording head--.
Line 29, "for" should read --from--.

Signed and Sealed this

Twentieth Day of November, 1990

*Attest:*

HARRY F. MANBECK, JR.

*Attesting Officer*

*Commissioner of Patents and Trademarks*